(12) United States Patent
Senatro et al.

(10) Patent No.: US 11,352,075 B2
(45) Date of Patent: Jun. 7, 2022

(54) AERODYNAMIC TRUCKING SYSTEMS

(71) Applicants: Strehl, LLC, Scottsdale, AZ (US); Great Dane LLC, Savannah, GA (US)

(72) Inventors: Richard Senatro, Scottsdale, AZ (US); Daniel J. McCormack, Rincon, GA (US); Christian Lee, Pooler, GA (US)

(73) Assignees: Strehl, LLC, Scottsdale, AZ (US); Great Dane LLC, Chicago, IL (US)

( * ) Notice: Subject to any disclaimer, the term of this patent is extended or adjusted under 35 U.S.C. 154(b) by 0 days.

(21) Appl. No.: 17/072,886

(22) Filed: Oct. 16, 2020

(65) Prior Publication Data

US 2021/0139085 A1 May 13, 2021

Related U.S. Application Data

(63) Continuation-in-part of application No. 17/034,803, filed on Sep. 28, 2020, and a continuation-in-part of application No. 16/811,635, filed on Mar. 6, 2020, which is a continuation-in-part of application No. 16/741,886, filed on Jan. 14, 2020, and a continuation-in-part of application No. 16/741,886, filed on Jan. 14, 2020, which is a continuation of application No. 16/211,648, filed on Dec. 6, 2018, now Pat. No. 10,829,168, which is a continuation-in-part of application No. 16/211,648, filed on Dec. 6, 2018, now Pat. No. 10,829,168, which is a continuation of application No. 15/958,342, filed on Apr. 20, 2018, now Pat. No. 10,583,873, which is a continuation of application No. 15/279,858, filed on Sep. 29, 2016, now Pat. No. 10,189,514, which is a continuation-in-part of
(Continued)

(51) Int. Cl.
*B62D 35/00* (2006.01)
*B62D 37/02* (2006.01)
*B62D 35/02* (2006.01)

(52) U.S. Cl.
CPC ......... *B62D 35/001* (2013.01); *B62D 35/005* (2013.01); *B62D 35/007* (2013.01); *B62D 35/008* (2013.01); *B62D 35/02* (2013.01); *B62D 37/02* (2013.01)

(58) Field of Classification Search
CPC .. B62D 35/001; B62D 35/002; B62D 35/008; B62D 35/02
USPC ............................... 296/180.1, 180.4, 181.2
See application file for complete search history.

(56) References Cited

U.S. PATENT DOCUMENTS 4,566,678 A 1/1986 Anderson
4,611,847 A 9/1986 Sullivan
(Continued)

FOREIGN PATENT DOCUMENTS

WO 2004062953 A2 7/2004
WO 2004087449 A2 10/2004
(Continued)

*Primary Examiner* — Jason S Daniels
(74) *Attorney, Agent, or Firm* — Noblitt & Newson, PLLC (57) ABSTRACT

An aerodynamic fairing assembly for attachment to a trailer of a tractor-trailer. The aerodynamic fairing assembly may comprise a front skirt fairing and a rear skirt comprising a transition. The transition may extend outwardly of the side skirt fairing at a distance from the centerline of the trailer. The side skirt faring and rear skirt fairing are coupled to the trailer by one or more struts.

19 Claims, 9 Drawing Sheets

Related U.S. Application Data application No. 15/277,172, filed on Sep. 27, 2016, now Pat. No. 9,975,583, which is a continuation of application No. 15/277,172, filed on Sep. 27, 2016, now Pat. No. 9,975,583, which is a continuation of application No. 14/935,647, filed on Nov. 9, 2015, now Pat. No. 9,751,573, which is a continuation of application No. 14/247,504, filed on Apr. 8, 2014, now Pat. No. 9,211,919, which is a continuation of application No. 13/633,013, filed on Oct. 1, 2012, now Pat. No. 8,727,425, which is a continuation-in-part of application No. 13/117,891, filed on May 27, 2011, now Pat. No. 8,303,025.

(60) Provisional application No. 62/923,100, filed on Oct. 18, 2019, provisional application No. 62/814,411, filed on Mar. 6, 2019, provisional application No. 62/234,403, filed on Sep. 29, 2015, provisional application No. 61/639,830, filed on Apr. 27, 2012, provisional application No. 61/374,572, filed on Aug. 17, 2010, provisional application No. 61/349,183, filed on May 27, 2010.

(56) References Cited

U.S. PATENT DOCUMENTS

| | | | |
|---|---|---|---|
| 4,746,160 | A | 5/1988 | Wiesemeyer |
| 5,280,990 | A | 1/1994 | Rinard |
| 6,079,769 | A | 6/2000 | Fannin et al. |
| 6,260,911 | B1 | 7/2001 | Becker |
| 6,644,720 | B2 | 11/2003 | Long et al. |
| 6,827,372 | B2 | 12/2004 | Barr et al. |
| 6,837,536 | B1 | 1/2005 | Schwartz |
| 6,974,178 | B2 | 12/2005 | Ortega et al. |
| 7,008,005 | B1 | 3/2006 | Graham |
| 7,093,889 | B2 | 8/2006 | Graham |
| 7,163,258 | B2 | 1/2007 | Dyer, II et al. |
| 7,404,592 | B2 | 7/2008 | Reiman et al. |
| 7,497,502 | B2 | 3/2009 | Wood |
| 7,578,541 | B2 | 8/2009 | Layfield et al. |
| 7,578,542 | B2 | 8/2009 | Layfield et al. |
| 7,604,284 | B2 | 10/2009 | Reiman et al. |
| 7,686,385 | B2 | 3/2010 | Dolan |
| 7,748,772 | B2 | 7/2010 | Boivin et al. |
| 7,780,224 | B2 | 8/2010 | Roush |
| 7,887,120 | B2 | 2/2011 | Boivin et al. |
| 7,938,475 | B2 | 5/2011 | Boivin et al. |
| 7,942,467 | B2 | 5/2011 | Boivin et al. |
| 7,942,468 | B2 | 5/2011 | Boivin et al. |
| 7,942,469 | B2 | 5/2011 | Boivin et al. |
| 7,942,470 | B2 | 5/2011 | Boivin et al. |
| 7,942,471 | B2 | 5/2011 | Boivin et al. |
| 8,292,351 | B2 | 10/2012 | Boivin et al. |
| 8,449,017 | B2 | 5/2013 | Boivin et al. |
| 8,678,474 | B1 | 3/2014 | Boivin et al. |
| 8,979,172 | B2 | 3/2015 | Reiman et al. |
| 9,004,575 | B2 | 4/2015 | Grandominico et al. |
| 9,283,998 | B2 * | 3/2016 | Kibler ................. B62D 35/001 |
| 9,637,184 | B1 * | 5/2017 | Bennett ................ B62D 35/001 |
| 9,669,883 | B2 | 6/2017 | Bassily et al. |
| 9,669,884 | B2 | 6/2017 | Bassily et al. |
| 2006/0152038 | A1 | 7/2006 | Graham |
| 2007/0120397 | A1 | 5/2007 | Layfield et al. |
| 2008/0061597 | A1 | 3/2008 | Reiman et al. |
| 2008/0061598 | A1 | 3/2008 | Reiman et al. |
| 2008/0093887 | A1 | 4/2008 | Wood |
| 2008/0296930 | A1 | 12/2008 | Roush et al. |
| 2009/0212595 | A1 | 8/2009 | Heppel et al. |
| 2009/0212596 | A1 | 8/2009 | Reiman et al. |
| 2010/0096880 | A1 | 4/2010 | Boivin et al. |
| 2010/0096881 | A1 | 4/2010 | Boivin et al. |
| 2010/0096882 | A1 | 4/2010 | Boivin et al. |
| 2010/0096883 | A1 | 4/2010 | Boivin et al. |
| 2010/0098481 | A1 | 4/2010 | Boivin et al. |
| 2010/0264690 | A1 | 10/2010 | Brown et al. |
| 2011/0062749 | A1 | 3/2011 | Graham et al. |
| 2011/0089716 | A1 | 4/2011 | Hall |
| 2011/0148142 | A1 | 6/2011 | Kint |
| 2011/0297035 | A1 | 12/2011 | Langerwisch et al. |
| 2012/0153668 | A1 | 6/2012 | van Raemdonck |
| 2013/0106135 | A1 | 5/2013 | Fraskovsky et al. |
| 2014/0217776 | A1 | 8/2014 | Senatro |
| 2014/0265438 | A1 | 9/2014 | Kronemeyer |
| 2015/0015027 | A1 | 1/2015 | Wirth |
| 2015/0015029 | A1 | 1/2015 | Wiegel |
| 2016/0121940 | A1 | 5/2016 | Courtney et al. |

FOREIGN PATENT DOCUMENTS

| WO | 2013043890 A1 | 3/2013 |
|---|---|---|
| WO | 2017059023 A1 | 4/2017 |

* cited by examiner

AERODYNAMIC TRUCKING SYSTEMS

CROSS-REFERENCES TO RELATED APPLICATIONS

The present application claims the benefit of U.S. Provisional Application Ser. No. 62/923,100, filed Oct. 18, 2019, entitled "METHODS AND APPARATUS FOR AN AERODYNAMIC TRUCKING SYSTEM" and is a continuation in part of U.S. Nonprovisional patent application Ser. No. 17/034,803 filed Sep. 28, 2020 entitled "AERODYNAMIC TRUCKING SYSTEMS," which is a continuation of U.S. Nonprovisional patent application Ser. No. 16/211,648 filed Dec. 6, 2018 entitled "AERODYNAMIC TRUCKING SYSTEMS," which is a continuation of U.S. Nonprovisional patent application Ser. No. 15/279,858 filed Sep. 29, 2016, now U.S. Pat. No. 10,189,514 entitled "AERODYNAMIC TRUCKING SYSTEMS," which claims the benefit of U.S. Provisional Application Ser. No. 62/234,403, filed Sep. 29, 2015, entitled "METHODS AND APPARATUS FOR AN AERODYNAMIC TRUCKING SYSTEM", and is a continuation in part of U.S. Nonprovisional patent application Ser. No. 15/277,172 filed Sep. 27, 2016, now U.S. Pat. No. 9,975,583 entitled "AERODYNAMIC TRUCKING SYSTEMS", which is a continuation of U.S. Nonprovisional patent application Ser. No. 14/935,647 filed Nov. 9, 2015, now U.S. Pat. No. 9,751,573 entitled "AERODYNAMIC TRUCKING SYSTEMS", which is a continuation of U.S. Nonprovisional patent application Ser. No. 14/247,504, filed Apr. 8, 2014, now U.S. Pat. No. 9,211,919 entitled "AERODYNAMIC TRUCKING SYSTEMS", which is a continuation of U.S. Nonprovisional patent application Ser. No. 13/633,013 filed Oct. 1, 2012, now U.S. Pat. No. 8,727,425 entitled, "AERODYNAMIC TRUCKING SYSTEMS", which claims the benefit of U.S. Provisional Application Ser. No. 61/639,830, filed Apr. 27, 2012, entitled "AERODYNAMIC TRUCKING SYSTEMS", and is a continuation-in-part of U.S. Nonprovisional patent application Ser. No. 13/117,891 filed May 27, 2011, now U.S. Pat. No. 8,303,025 entitled "AERODYNAMIC TRUCKING SYSTEMS", which claims the benefit of U.S. Provisional Application Ser. No. 61/349,183, filed May 27, 2010, entitled "AERODYNAMIC TRUCKING SYSTEMS"; and, claims the benefit of U.S. Provisional Application Ser. No. 61/374,572, filed Aug. 17, 2010, entitled "AERODYNAMIC TRUCKING SYSTEMS"; and incorporates the disclosure of each application by reference; and the present application is a continuation in part of U.S. patent application Ser. No. 16/811,635, filed Jul. 23, 2020, entitled "AERODYNAMIC TRUCKING SYSTEMS" which claims the benefit of U.S. Provisional Application Ser. No. 62/814,411, filed Mar. 6, 2019, entitled "METHODS AND APPARATUS FOR AN AERODYNAMIC TRUCKING SYSTEM" and is a continuation in part of U.S. Nonprovisional patent application Ser. No. 16/211,648 filed Dec. 6, 2018 entitled "AERODYNAMIC TRUCKING SYSTEMS", which is a continuation of U.S. Nonprovisional patent application Ser. No. 15/279,858 filed on Sep. 29, 2016, now U.S. Pat. No. 10,189,514 and claims the benefit of U.S. Provisional Application Ser. No. 62/234,403, filed Sep. 29, 2015, entitled "METHODS AND APPARATUS FOR AN AERODYNAMIC TRUCKING SYSTEM" and is a continuation in part of U.S. Nonprovisional patent application Ser. No. 16/741,886 filed Jan. 14, 2020 entitled "AERODYNAMIC TRUCKING SYSTEMS", which is a continuation of U.S. Nonprovisional patent application Ser. No. 15/958,342 filed Apr. 20, 2018 entitled "AERODYNAMIC TRUCKING SYSTEMS", which is a continuation of U.S. Nonprovisional patent application Ser. No. 15/277,172 filed Sep. 27, 2016, now U.S. Pat. No. 9,975,583 entitled "AERODYNAMIC TRUCKING SYSTEMS", which is a continuation of U.S. Nonprovisional patent application Ser. No. 14/935,647 filed Nov. 9, 2015, now U.S. Pat. No. 9,751,573 entitled "AERODYNAMIC TRUCKING SYSTEMS", which is a continuation of U.S. Nonprovisional patent application Ser. No. 14/247,504, filed Apr. 8, 2014, now U.S. Pat. No. 9,211,919 entitled "AERODYNAMIC TRUCKING SYSTEMS", which is a continuation of U.S. Nonprovisional patent application Ser. No. 13/633,013 filed Oct. 1, 2012, now U.S. Pat. No. 8,727,425 entitled, "AERODYNAMIC TRUCKING SYSTEMS", which claims the benefit of U.S. Provisional Application Ser. No. 61/639,830, filed Apr. 27, 2012, entitled "AERODYNAMIC TRUCKING SYSTEMS", which is a continuation-in-part of U.S. Nonprovisional patent application Ser. No. 13/117,891 filed May 27, 2011, now U.S. Pat. No. 8,303,025 entitled "AERODYNAMIC TRUCKING SYSTEMS", which claims the benefit of U.S. Provisional Application Ser. No. 61/349,183, filed May 27, 2010, entitled "AERODYNAMIC TRUCKING SYSTEMS"; and, which claims the benefit of U.S. Provisional Application Ser. No. 61/374,572, filed Aug. 17, 2010, entitled "AERODYNAMIC TRUCKING SYSTEMS"; and incorporates the disclosure of each application by reference. To the extent that the present disclosure conflicts with any referenced application, however, the present disclosure is to be given priority.

BACKGROUND OF THE TECHNOLOGY

This technology relates to aerodynamic trucking systems. More particularly, this technology relates to providing a system of aerodynamic apparatus configured to minimize aerodynamic drag and maintain smoother air flow over highway-operated vehicles, particularly long-haul tractor-trailer vehicles.

Most large long-haul cargo trailers exhibit less than optimal aerodynamic performance during highway operation. At highway speeds, conventional trailers develop a substantial amount of turbulent airflow in the region between the axles below the trailer box. This turbulence results in significant aerodynamic drag, increasing both fuel consumption and Nitrogen Oxide (NOx) emissions at the motorized towing vehicle. Additionally, temporarily sustained vibration of external vehicle surfaces due to transient wind-force loading is often associated with premature wear, noise, and early failures within such aerodynamic vehicle structures. A system and method to improve the aerodynamic performance of long-haul transport vehicles in the above-noted areas is described below.

SUMMARY OF THE TECHNOLOGY

An aerodynamic faring assembly for attachment to a trailer of a tractor-trailer may comprise a side skirt fairing and rear skirt fairing having a transition. The transition may be located aft of the side skirt fairing. One or more struts may be used to couple the side skirt fairing and rear skirt fairing having a transition to one or more or of the transverse structural support members.

BRIEF DESCRIPTION OF THE DRAWINGS

A more complete understanding of the present technology may be derived by referring to the detailed description when considered in connection with the following illustrative figures. In the following figures, like reference numbers refer to similar elements and steps throughout the figures.

DETAILED DESCRIPTION OF EXEMPLARY EMBODIMENTS

The present technology may be described in terms of functional block components and various processing steps. Such functional blocks may be realized by any number of components configured to perform the specified functions and achieve the various results. For example, the present technology may employ various types of materials, connectors, panel, mounts, and the like for aerodynamic trucking systems, and the system described is merely one exemplary application for the technology.

Methods and apparatus for providing an aerodynamic trucking system designed to reduce aerodynamic drag and maintain smoother air flow over highway-operated vehicles, particularly long-haul tractor-trailer vehicles. Various representative implementations of the present technology may be applied to any system for reducing aerodynamic drag and maintaining smoother air flow over highway-operated vehicles, particularly long-haul tractor-trailer vehicles.

Generally, an undercarriage of a conventional cargo trailer is comprised of groupings of various drag-producing components, which generally reside below a cargo-supporting floor deck, customarily having a rectangular shape. The drag-producing components of a semi-type cargo trailer undercarriage customarily include longitudinal and transverse structural support members, rear axles, brake components, mud flaps, wheels, tires, etc. Each aerodynamic skirt fairing functions to direct air away from the central regions of the trailer undercarriage, which contain the majority of such drag-producing components. Such directional control of airflow during transport operations reduces the parasitic drag-producing interactions between the air and the above-noted structures. More specifically, aerodynamic skirt fairings of aerodynamic trucking system are preferably designed to reduce aerodynamic drag by promoting a more continuous laminar air flow along the sides of cargo trailer.

Despite a general conformity of van-type trailer designs within the trailer industry, variations exist between the offerings of the various trailer manufacturers. Aerodynamic trucking systems are typically designed to be universally adaptable to most conventional semi-type cargo trailers. To accommodate specific aerodynamic variations within the various trailer configurations, each aerodynamic skirt fairing system may be designed to be mountable to the undercarriage of the cargo trailer and may extend along the sides of the trailer at various locations and lengths. The positioning of the aerodynamic skirt fairing system along the sides of the trailer can optimize the aerodynamic performance of an installed aerodynamic skirt fairing system based on the unique aerodynamic requirements of a specific vehicle platform. Furthermore, the aerodynamic trucking system may be designed to have a skirt that may cover or be located adjacent to the wheels or covering the wheels while also maintaining suitable side skirt configurations.

Figure 1:
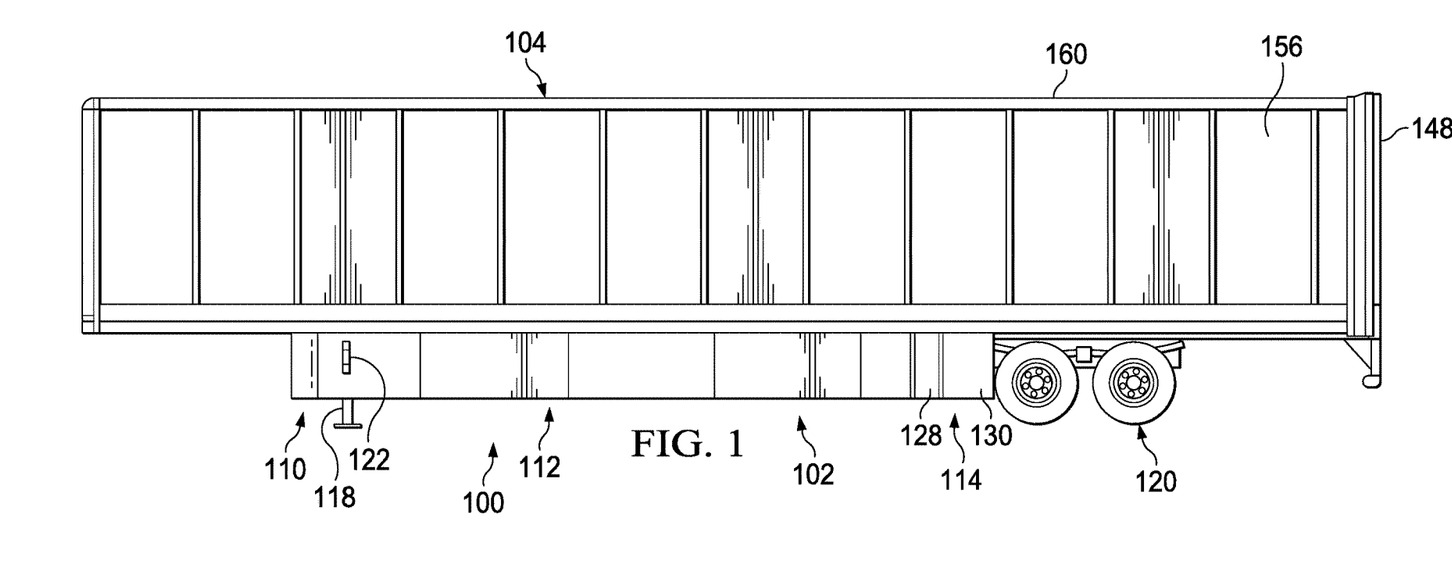
FIG. 1 representatively illustrates a side view of a trailer with an aerodynamic trucking system in accordance with an exemplary embodiment of the present technology.
Figure 2:
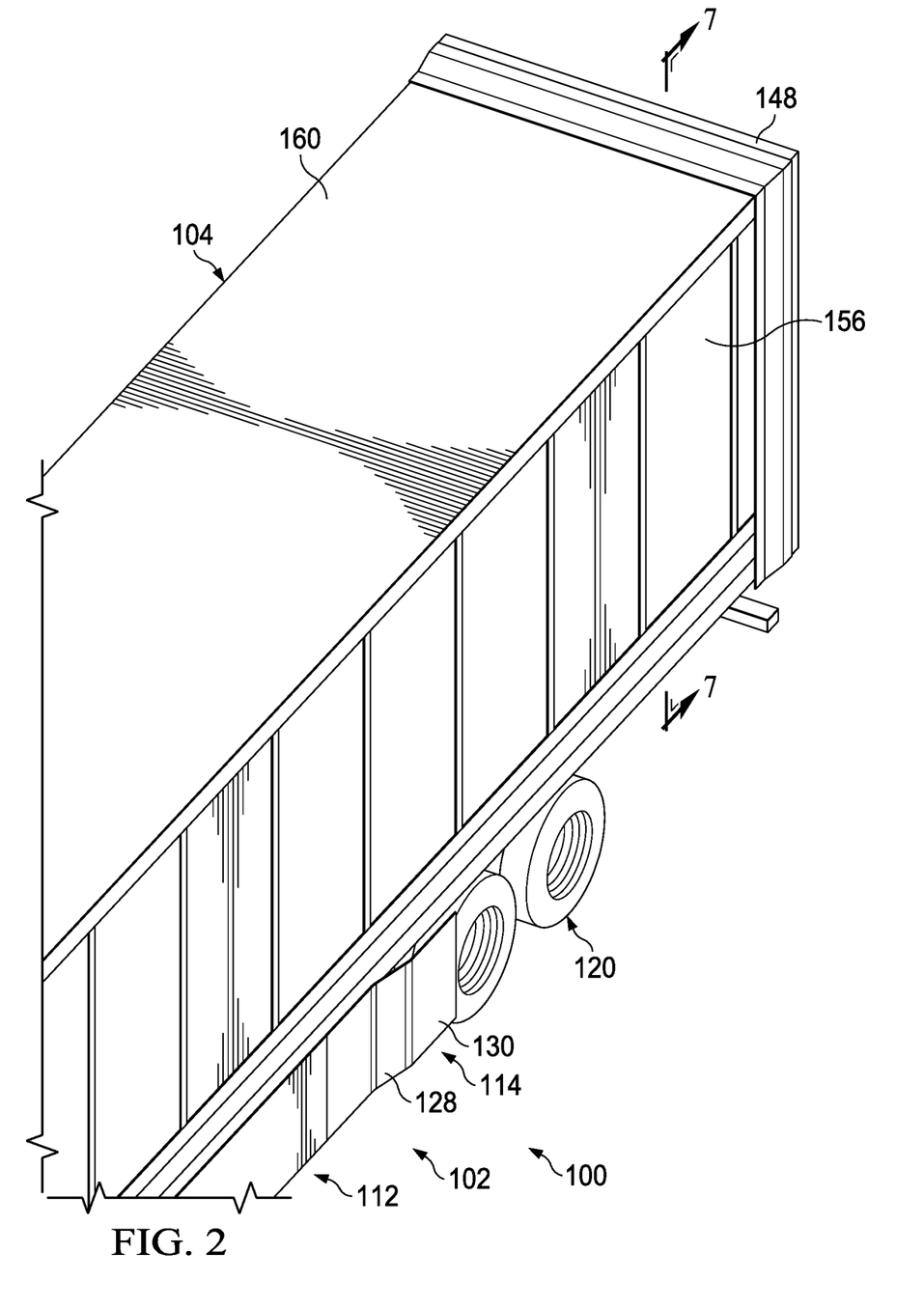
FIG. 2 representatively illustrates a partial, top, perspective view of a trailer with an aerodynamic trucking system in accordance with an exemplary embodiment of the present technology.
Figure 5A:
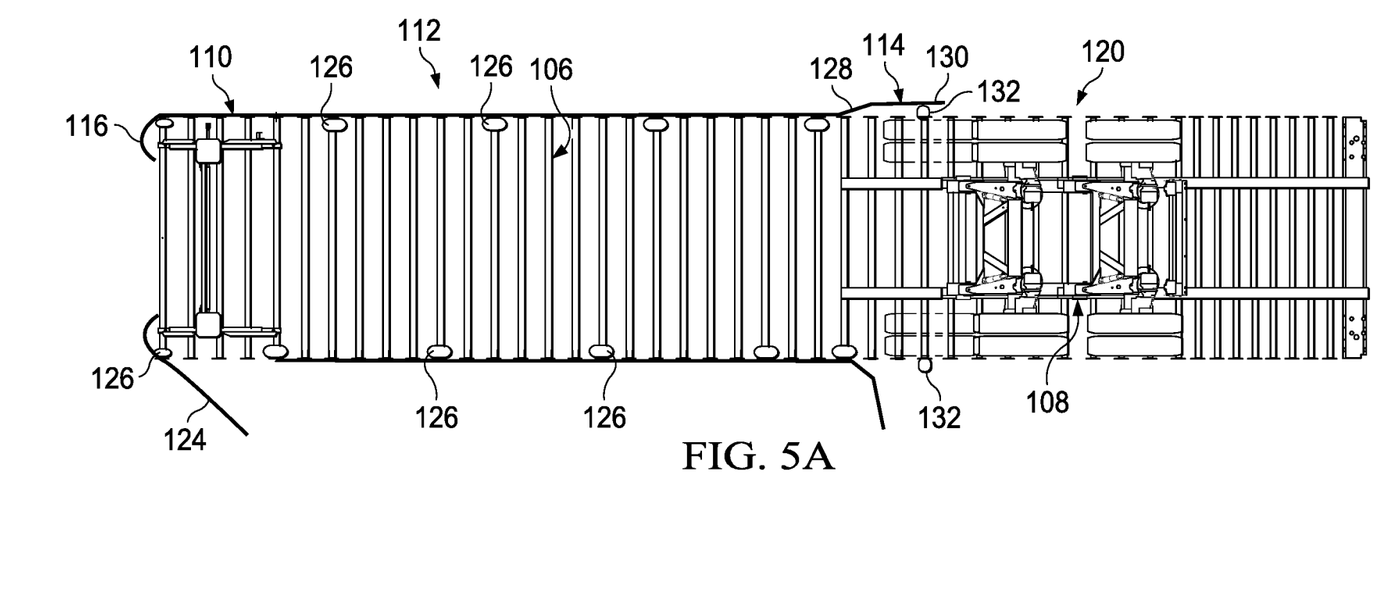
FIG. 5A representatively illustrates a bottom view of the aerodynamic trucking system mounted on a partial view of the underside of a trailer in accordance with an exemplary embodiment of the present technology.
Figure 5B:
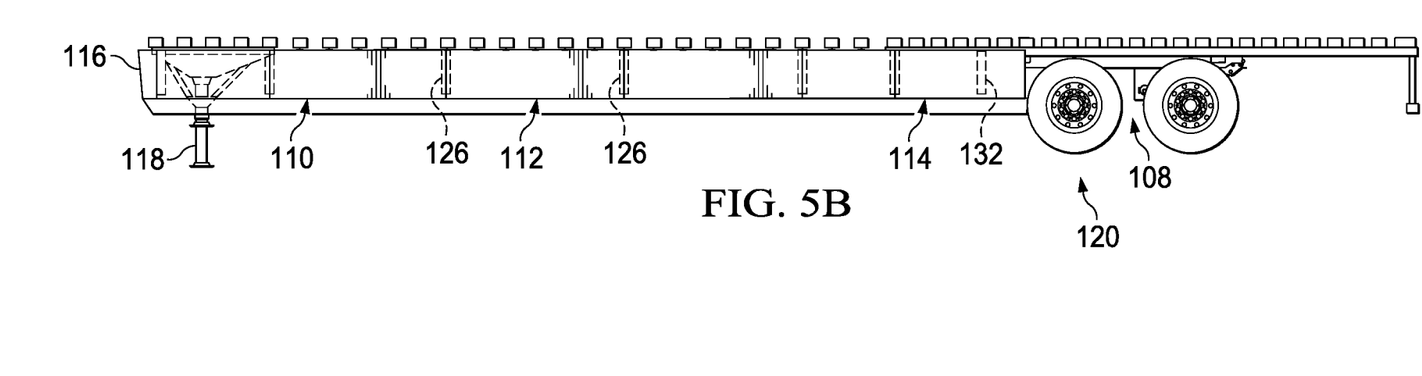
FIG. 5B representatively illustrates a left side view of the aerodynamic trucking system mounted on a partial view of the side of a trailer in accordance with an exemplary embodiment of the present technology.
Figure 5C:
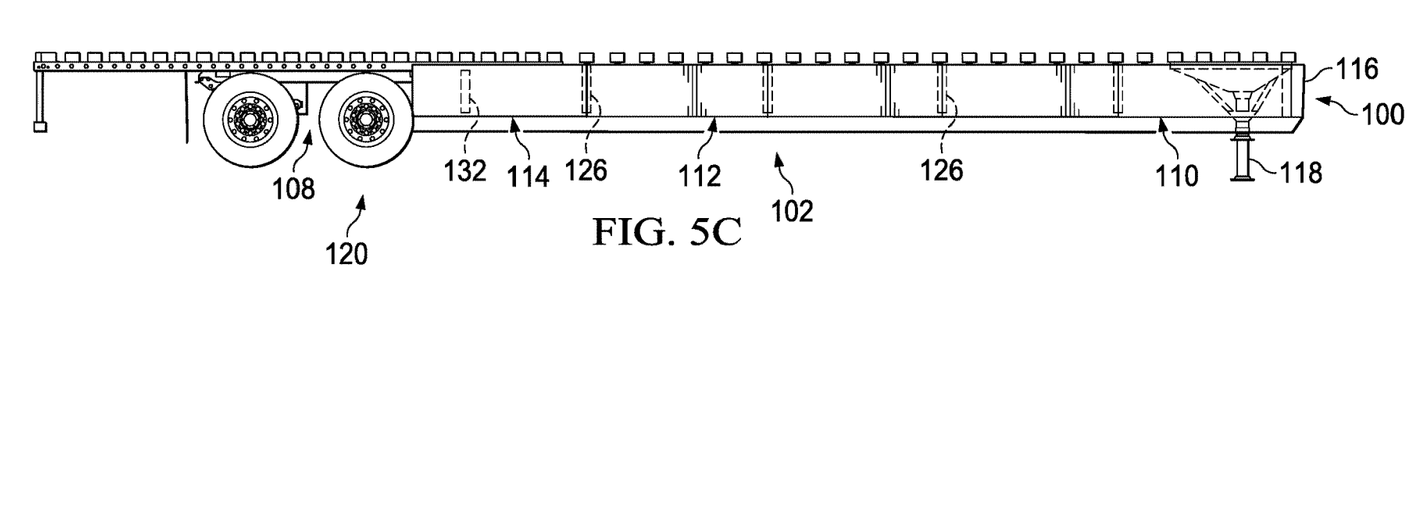
FIG. 5C representatively illustrates a right side view of the aerodynamic trucking system mounted on a partial view of the side of a trailer in accordance with an exemplary embodiment of the present technology.

Referring to FIGS. 1 and 2, an aerodynamic trucking system 100 is shown comprising a skirt faring system 102 mounted to an undercarriage of a cargo trailer 104. The aerodynamic trucking system 100 is configured to manage airflow around, behind, and under a semi-type cargo trailer 104, with the goal of significantly reducing aerodynamic turbulence during operation. As shown in FIGS. 5A-C, the cargo trailer 104 may comprise a frame having a plurality of lateral cross-beams 106 and fixed longitudinal members (not shown). The fixed longitudinal members are welded to the lateral cross-beams 106. The bogie 108 is comprised of wheels 120, frame, tires and axles, and the suspension system of the trailer 104. The bogie 108 is longitudinally adjustable by the driver/operator to accommodate various loading situations.

The aerodynamic trucking system 100 may be constructed of any suitable material. Each of the components may be constructed from industry-standard materials selected to comprise a structural rigidity sufficient to support the required air deflection function, while offering a level of mechanical flexibility sufficient to deflect resiliently under small to moderate impact loads, thereby reducing the need for frequent panel repair or replacement due to permanent impact damage. Materials suitable for use in the aerodynamic skirt faring system 100 may comprise, such as, for example, steel, steel composite, low-density steel composite, high-density steel composite, aluminum, aluminum composite, low-density aluminum composite, high-density aluminum composite, molded polymer panels, polymer-based composite panels, fiber-reinforced polymer panels, and injection molded polycarbonate, acrylonitrile butadiene styrene ("ABS") plastic, polypropylene, polyethylene, low-density polyethylene, high-density polyethylene, and polystyrene, polyvinyl chloride ("PVC") or any suitable combination or mixture thereof. In one embodiment, the material for the aerodynamic skirt faring system 100 may comprise an injection molded material. In one embodiment, the material for the aerodynamic skirt faring system 102 may comprise an injection molded mixture of polycarbonate and ABS plastic. In other embodiments, the material for the aerodynamic skirt faring system 102 may comprise an injection molded mixture of polycarbonate, ABS plastic, polypropylene and the like. One of ordinary skill in the art will appreciate that, under appropriate circumstances, considering such issues as cost, user preference, etc., other material selections for the aerodynamic skirt faring system 100 may be used. It should be understood to be highly beneficial for the aerodynamic skirt faring system 100 to comprise light and more flexible materials, without exhibiting unstable behavior under dynamic loading.

FIG. 1 shows a side view, illustrating left-side components of an aerodynamic skirt fairing system 102, mounted in an operable position adjacent an underside of the cargo trailer 104, according to an embodiment of the present technology. It should be noted that the structures and arrangements of the depicted left-side components are substantially mirror images of the right-side components with some possible minor exceptions.

The aerodynamic skirt faring system 102 may comprise various combinations of at least one of a pair of front skirt fairings 110, a pair of side skirt fairings 112, and a pair of rear skirt fairings 114. The front skirt fairing 110, side skirt fairings 112, and rear skirt fairings 114 can be sized appropriately and made of one or more than one component and constructed depending on any suitable configuration.

In general, the placement of the skirt fairing system 102 may be symmetrical and generally parallel, although the angle may be adjusted depending of the specific trailer and or tractor-trailer combination, with respect to longitudinal axis of cargo-supporting floor deck. The skirt fairing system 102 may be adjustable along the longitudinal axis of the cargo trailer 104.

Figure 3A:
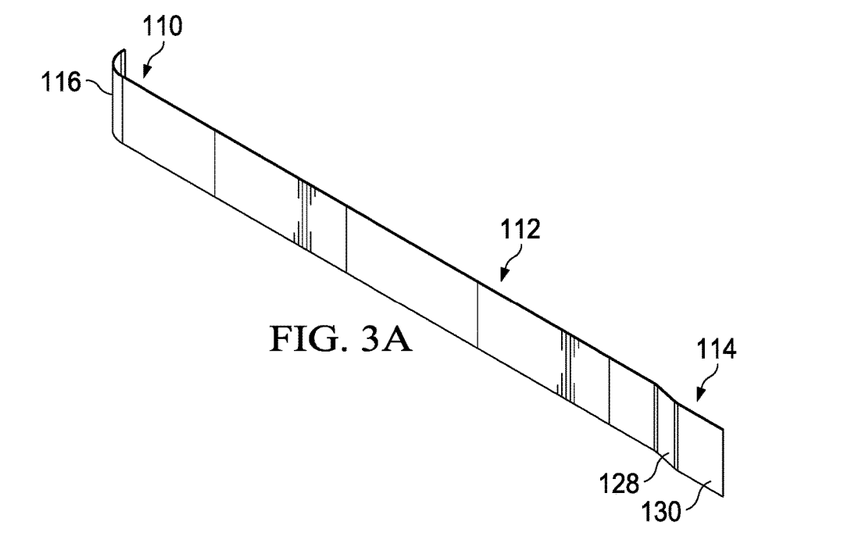
FIG. 3A representatively illustrates a perspective view of the aerodynamic trucking system in accordance with an exemplary embodiment of the present technology.
Figure 3B:
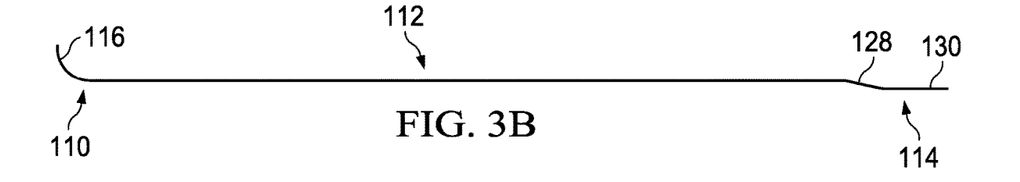
FIG. 3B representatively illustrates a top view of the aerodynamic trucking system in accordance with an exemplary embodiment of the present technology.
Figure 3C:
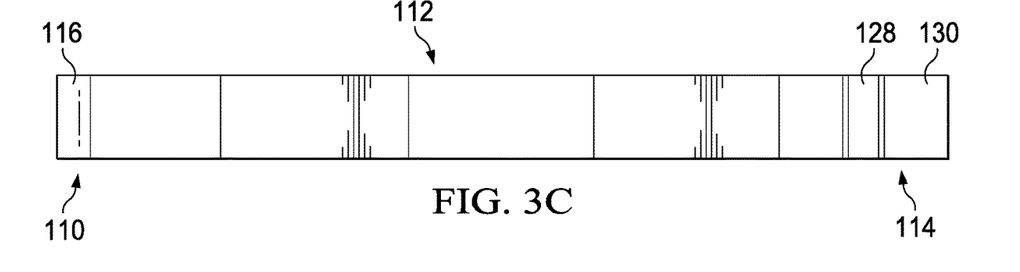
FIG. 3C representatively illustrates a side view of the aerodynamic trucking system in accordance with an exemplary embodiment of the present technology.
Figure 4A:
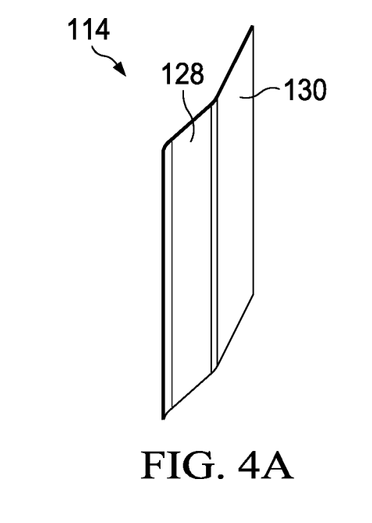
FIG. 4A representatively illustrates a perspective view of a rear skirt fairing in accordance with an exemplary embodiment of the present technology.
Figure 4B:
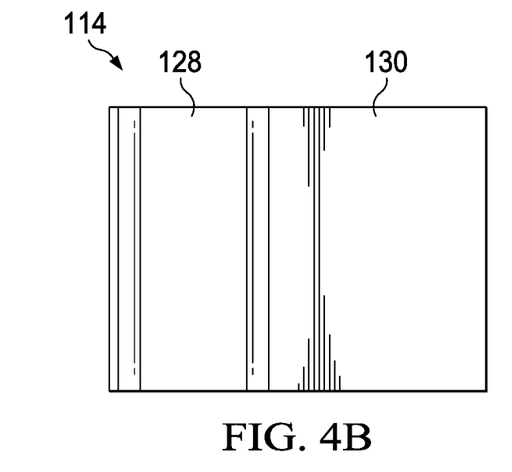
FIG. 4B representatively illustrates a front side view of a rear skirt fairing in accordance with an exemplary embodiment of the present technology.
Figure 4C:
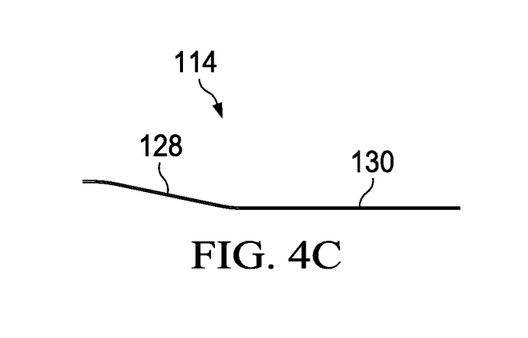
FIG. 4C representatively illustrates a top view of a rear skirt fairing in accordance with an exemplary embodiment of the present technology.
Figure 4D:
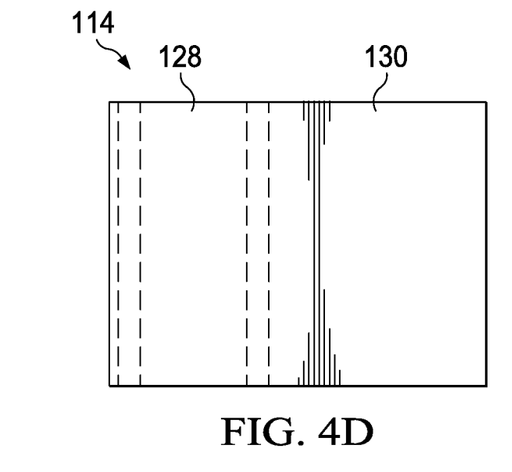
FIG. 4D representatively illustrates a back side view of a rear skirt fairing in accordance with an exemplary embodiment of the present technology.

In various embodiments, as shown in FIGS. 3A-3C, the components of the aerodynamic skirt fairing system 102 are constructed to interconnect with one another by any known method. In various embodiments, the components may comprise any type of male to female, tongue and groove, and/or hand to glove connector configuration as understood by one of ordinary skill in the art. In various embodiments, the components may simply abut. Additionally, any of the front skirt fairing 110, side skirt fairings 112, and rear skirt fairings 114 may be connected to each other and/or one another in the manner described above and below.

Any combination of the front skirt fairing 110, the side skirt fairing 112, and the rear skirt fairing 114 may be contemplated. In one embodiment, the front skirt fairing 110, the side skirt fairing 112, and the rear skirt fairing 114 are coupled together to comprise the skirt fairing system 102. In another embodiment, the rear skirt fairing 114 may be attached to an existing side skirt fairing or proximately adjacent to the rear edge of an existing side skirt fairing. The front skirt fairing 110 and side skirt fairing 112 may comprise substantially planar external faces that are essentially solid (that is, impermeable to the passage of air). The front skirt fairing 110 and side skirt fairing 112 may comprise a continuous single piece or multiple piece configurations. Each of the front skirt fairing 110 and side skirt fairing 112 are preferably mounted to the transverse structural support members 106 (shown in FIGS. 5A-C and as understood by one of ordinary skill in the art) extending between sides of the trailer frame of the cargo trailer 104.

The front skirt fairing 110 may comprise a cap 116 that is located proximate the front landing gear 118 on the trailer 104. The side skirt fairing 112 may extend rearward from the front skirt fairing 110 to approximately the location of the rear wheels 120. In one embodiment, the side skirt fairings 112 are substantially straight and run parallel to the centerline of the cargo trailer 104. In another embodiment the orientation of the side skirt fairing 112 may move outwardly from centerline the front to the rear of the trailer 104. The rear skirt fairing 116 extends rearward from the rear edge of the side skirt fairing 112.

In various embodiments, shown in FIG. 1, the front skirt fairing 110 may comprise an opening 122, such that, a user may use to adjust the landing gear 118. In one embodiment, shown in FIG. 5A, the front skirt fairing 110 may comprise a door 124, for access the landing gear 118. The door 124 may be pivotably attached to the trailer 104 such that the front skirt fairing 110 may rotate for access to the landing gear 118. The door 124 may be coupled to a strut 126 by a hinge or any other suitable rotational attachment component to allow the door 124/front skirt fairing 110 to open and rotate forwardly for access to the landing gear 118. The strut 126 may serve as the hinge for the door 124 to rotate about. The strut 126 may further be configured to serve as the frame for the door 124. The door 124 may be coupled to the strut 126 by any suitable attachment method including rivets, bolts, screws, and the like. The door 124 may be configured to provide additional aerodynamic benefit.

Referring to FIGS. 4A-D, the rear skirt fairing 114 may comprise a transition 128 and a panel 130. In one embodiment, the transition 128 is configured to reside proximate the side skirt fairings 112. In one embodiment the transition 128 is configured to proximately contact the side skirt fairing 112. In one embodiment, the transition 128 is configured to not proximately contact the side skirt fairing 112. In one embodiment, the side skirt fairing 112, the transition 128, and the panel 130 has a linear path in line with the side of the trailer 104 and parallel to the centerline of the trailer.

In one embodiment the transition 128 may be angled outwardly from the side skirt fairings with respect to the centerline of the cargo trailer 104. In other words, to augment aerodynamic performance of the overall fairing assembly, a leading edge of each transition 128 may be canted outwardly at a suitable inclination. The angle of the transition 128 redirects the air prior to reaching the rear of the trailer 104. In other words the orientation of the transition 128 causes a disruption of the airflow and redirects the air as the trailer 104 moves forward.

This slight angle provides additional clearance for the panel 130 of rear skirt fairing 114 to be located an additional distance of no more than 3 inches outward of the side skirt fairings 112 to accommodate the trailer wheels 120. A smaller angle may be used to provide less clearance distance to accommodate various configurations and designs. As such, the linear path along the length of the cargo trailer 104 for the rear skirt fairing 114 is located outward of the linear path of the side skirt fairings 112 in order to clear the tires on the trailer wheels 120. In standard configurations, the tires on the trailer wheels 120 typically extend only to the outer base/trailer envelope of the cargo trailer 104. However, Federal law allows certain safety equipment devices, such as splash and spray suppression devices, to exceed the outer base/trailer envelope by no more than 3 inches. The skirt fairing system 112 that is aligned outwardly from the centerline of the tires on the trailer wheels 120 would provide a benefit in aiding splash and spray suppression. The skirt fairing system 112 that is aligned outwardly from the centerline of the tires on the trailer wheels 120 would provide a benefit in suppressing a tire fragment from entering traffic if a blowout occurs. As such, the orientation of the transition 128 and rear skirt fairing 114 allow the cargo trailer 104 to comply with Federal law. In other words, the orientation of the transition 128 and the rear skirt fairing 14 allow a portion or portions of the aerodynamic skirt fairing system 102 to reside outside the outer base/trailer envelope. If Federal Law changes to allow more or less than 3 inches clearance outside the outer base/trailer envelope then the clearance discussed above should be applicable with the new Federal Law.

The rear skirt fairings 114 operate to reduce the drag on the wheels 120 to improve aerodynamic performance but still provide for airflow to the brakes and tires on the trailer wheels 120 such that they do not overheat. The orientation of the panel 130 on the rear skirt fairing 114 at an additional distance of no more than 3 inches outward of the side skirt fairings 112 provides aerodynamic benefits since the linear path along the length of the cargo trailer 104 for the panel 130 on the rear skirt fairing 130 is located outward of the linear path of the side skirt fairings 112 and redirects the air prior to reaching the rear of the trailer 104. In other words, the orientation of the transition 128 causes a disruption of the airflow and redirects the air as the trailer 104 moves forward. The rear skirt fairing 114 is configured to redirect or misdirect the airflow around the rear of the trailer such that non-linear airflow is achieved.

In one embodiment, shown in FIGS. 4A-4D, the rear skirt fairing 114 may be a stand-alone device that is capable of attachment to any conventional side skirt fairing arrangement. In various embodiments, a rear skirt fairing may comprise any fin, vane, plenum, treatment and the like that is configured to attach to a side skirt fairing. The rear skirt fairing 114 contemplated may attached by any known method, such as, bolts, rivets or any other suitable attachment method. The rear skirt fairing 114 is configured to protrude outwardly from the surface of the side skirt to which it is attached and to disrupt the air flow along the side fairing. The rear skirt fairing 114 is configured to redirect or misdirect the air around the rear of the trailer such that non-linear air flow is achieved.

Referring now to FIGS. 5A-C, the skirt faring system 102 may comprise various combinations of at least one of a pair of front skirt fairings 110, a pair of side skirt fairings 112, and a pair of rear skirt fairings 114. The skirt faring system 102 can be sized appropriately and made of one or more than one component and constructed depending on any suitable configuration. The front skirt fairings 110 and side skirt fairings 112 may be mounted to the lateral cross beams 106 by struts 126. Any suitable strut will suffice for mounting front skirt fairings 110 and side skirt fairings 112 to the lateral cross beams 106 of the trailer 104. One example of a rotatable strut and side skirt fairing configuration is shown in U.S. Patent Publication No. 2018/0237081, which is incorporated by reference.

The skirt faring system 102 is located just aft of the truck wheels (not shown) and extends transverse of the centerline of the cargo trailer 104. The skirt faring systems 102 are substantially straight and run parallel to the centerline of the cargo trailer. Preferably, the skirt faring system 102 comprise substantially planar external faces that are essentially solid (that is, impermeable to the passage of air).

The rear skirt fairing 114 extends rearward from the side skirt fairing 112 to approximately the front edge of the wheels 120, depending on the location of the wheels. As is understood, the wheels 120, which are mounted on the bogie 108, may be adjusted forward or rearward to accommodate any preference by the user or to conform to various state laws. For example, the wheels 120 may be used in the "California Position" which is 40 feet from the kingpin to the center of the rear axle. The movable nature of the wheels 120 allows the wheels 120 to reside adjacent a rear edge of the rear skirt fairing 114 or be partially covered by the rear skirt fairing 114.

In various embodiments, the orientation of the rear skirt fairing 114 allows a portion or portions of the skirt faring system 102 to reside outside the outer base/trailer envelope. This angle of the transition 128 may provide additional clearance for the panel 130 to be located an additional distance outward of the side skirt fairing 112. As such the linear path along the length of the cargo trailer for the rear skirt fairing 114 may be located outward of the linear path of side skirt fairing system 112. As such, the orientation of the rear skirt fairing 114 allows the cargo trailer 104 to comply with Federal law. Examples of these types of designs are shown and further discussed in U.S. Pat. No. 10,189,514, which is incorporated by reference.

In various embodiments, the side skirt fairing 112 is shown oriented parallel to the centerline of the cargo trailer. The side skirt fairing 112 may also be oriented as shown in U.S. Patent Publication No 2018/0237081, which is incorporated by reference. The front and side skirt fairings 110, 112 may also be oriented as shown in U.S. Pat. No. 10,189, 514, which is incorporated by reference.

Figure 6:
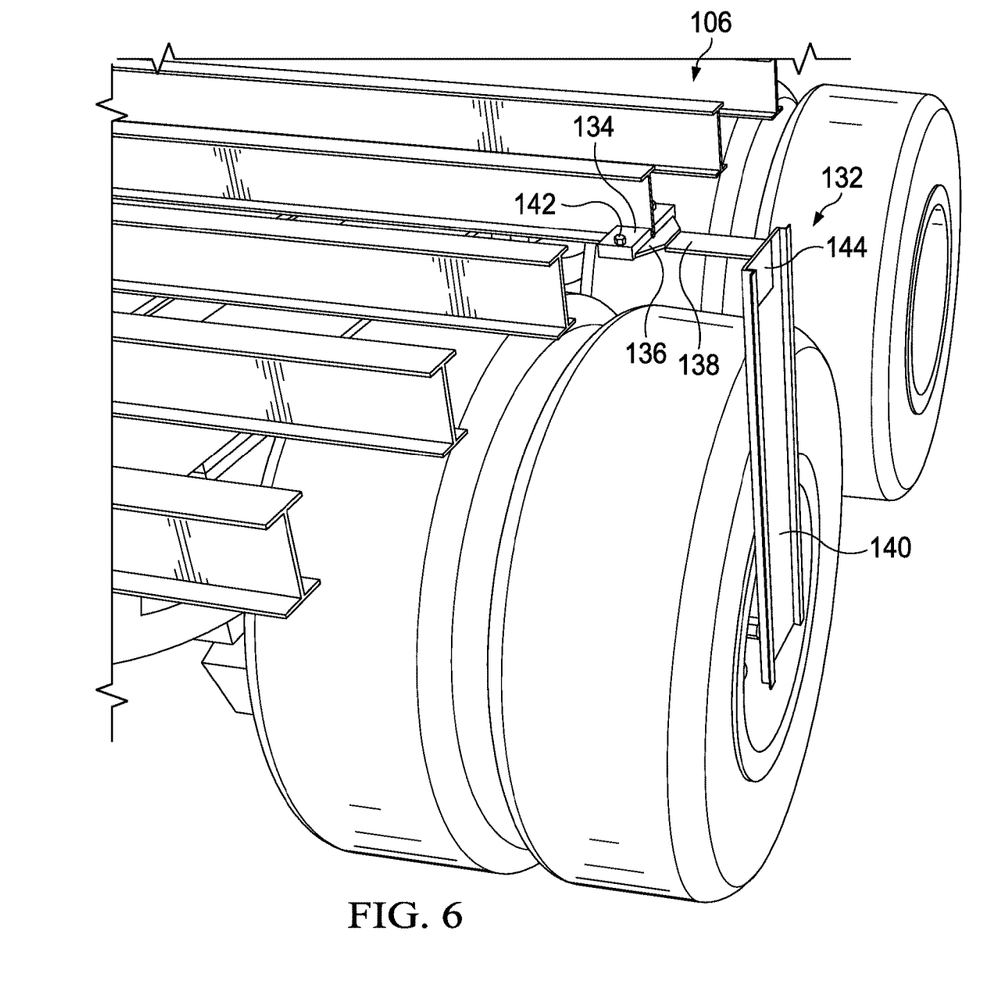
FIG. 6 representatively illustrates a perspective view of a mounting bracket in accordance with an exemplary embodiment of the present technology.

In various embodiments, and as shown in FIG. 6, the rear skirt fairing 114 may be coupled to the lateral cross-beam 106 by strut 132. The strut 132 may comprise a pair of upper clamping members 134, a clamping plate 136, a plate extender 138, and a vertical mounting arm 140. The pair of upper clamping members 134 and the clamping plate 136 are coupled by a bolted connection 142 to the lower I-beam portion of the lateral cross-beam 106 to attach the strut 132 to the trailer 104. This configuration is shown in FIGS. 6, 7, 17, and 18 of U.S. Patent Publication No. 2018/0237081. The plate extender 138 is rigidly mounted to the clamping plate 136 and extends outwardly, generally horizontally, from the lateral cross-beam 106. The plate extender 138 may comprise an L-shaped arm 144, which extends downwardly from the outward most end. The vertical mounting arm 140 is rigidly mounted to the L-shaped arm 144 and extends downwardly therefrom. The rear skirt fairing 114 is mounted to the vertical mounting arm 140 by any known method, including bolts, rivets, and the like. In various embodiments, the clamping plate 136, plate extender 138, and vertical mounting arm 140 may be separate or integral pieces.

As shown in FIG. 5A, in one embodiment, the rear skirt fairing 114 may comprise a door 124. The door 124 may be pivotally connected to the strut 126 at a front edge. In one embodiment, the rear edge of the side skirt fairing and the front edge of the rear skirt fairing are coupled together via a piano hinge (not shown) as is understood by one of ordinary skill in the art. The piano hinge is coupled to the strut 126. As such, in operation the rear skirt fairing 114 may rotate about the vertical axis of the piano hinge, which is coupled to strut 126. The rear skirt is held in place by a latch (not shown) as is understood by one of ordinary skill in the art.

Figure 7:
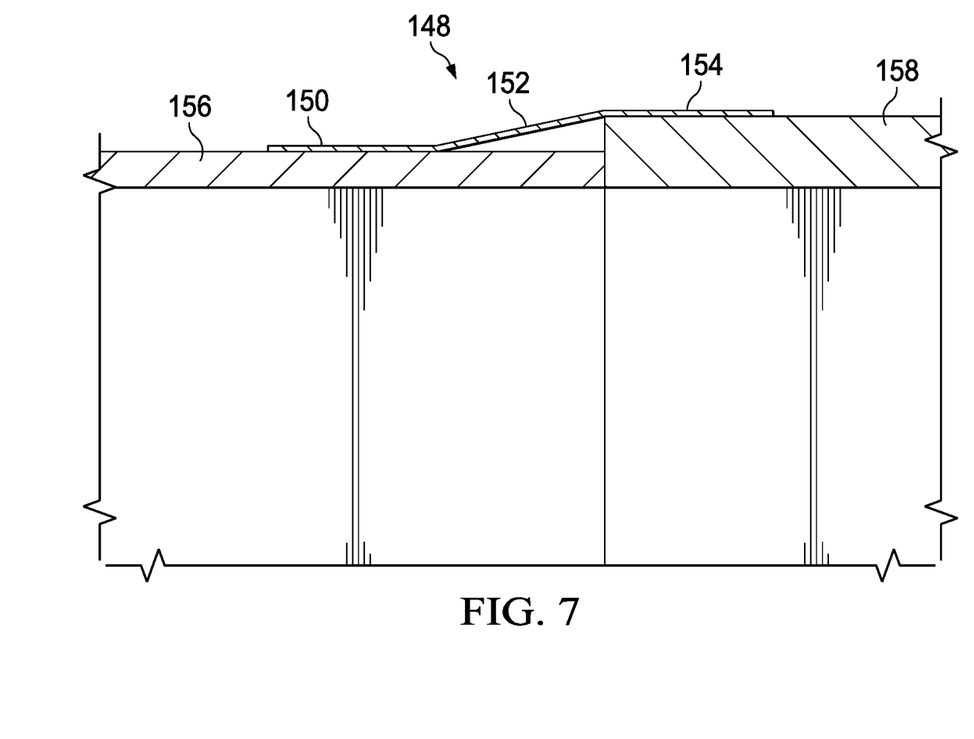
FIG. 7 representatively illustrates a cross section of a rear tail skirt in accordance with an exemplary embodiment of the present technology.

In various embodiments, shown in FIGS. 1, 2, and 7 an exit skirt faring 148 may be provided. The exit skirt faring 148 may be made of the same material as the skirt faring system 102 discussed above. In one embodiment, the exit skirt faring 14 may be constructed of a deformable material. In one embodiment, the exit skirt faring 14 may be constructed of a deformable rubber material.

In various embodiments, the exit skirt faring 148 may comprise a forward panel 150, a transition 152, and a rear panel 154. In one embodiment, the forward panel 150 may be mounted to a side panel 156 of the cargo trailer 104. The rear panel 154 may be mounted to a rear door frame 158 of the cargo trailer 104. The transition 152 is located between the forward panel 150 and the rear panel 150 and is configured to allow for smooth airflow over the rear door frame 158. The transition 152 may be angled outwardly from the forward panel 150 with respect to the centerline of the cargo trailer 104. In other words, to augment aerodynamic performance of the overall fairing assembly, a leading edge of each transition 152 may be canted outwardly at a suitable inclination. The angle of the transition 152 redirects the airflow prior to reaching the rear door frame 158 of the cargo trailer 104. It should be appreciated that the exit skirt fairing 148 may be coupled to the cargo trailer 104 along the side panels 156 of the cargo trailer and along a top panel 160 of the cargo trailer 104 to conceal the rear door frame 158.

In the foregoing description, the technology has been described with reference to specific exemplary embodiments. Various modifications and changes may be made, however, without departing from the scope of the present invention as set forth. The description and figures are to be regarded in an illustrative manner, rather than a restrictive one and all such modifications are intended to be included within the scope of the present invention. Accordingly, the scope of the technology should be determined by the generic embodiments described and their legal equivalents rather than by merely the specific examples described above. For example, the steps recited in any method or process embodiment may be executed in any appropriate order and are not limited to the explicit order presented in the specific examples. Additionally, the components and/or elements recited in any system embodiment may be combined in a variety of permutations to produce substantially the same result as the present invention and are accordingly not limited to the specific configuration recited in the specific examples.

Benefits, other advantages and solutions to problems have been described above with regard to particular embodiments. Any benefit, advantage, solution to problems or any element that may cause any particular benefit, advantage or solution to occur or to become more pronounced, however, is not to be construed as a critical, required or essential feature or component.

The terms "comprises," "comprising," or any variation thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the present technology, in addition to those not specifically recited, may be varied or otherwise particularly adapted to specific environments, manufacturing specifications, design parameters or other operating requirements without departing from the general principles of the same.

The invention claimed is:

1. An aerodynamic fairing assembly for attachment to a trailer of a tractor-trailer having a top, bottom, front, rear, a pair of sides, a trailer frame having a centerline, transverse structural support members extending between sides of the trailer defining a trailer envelope, and longitudinal members extending along a length of the trailer, and having at least one rear wheel assembly situated below the trailer frame, the aerodynamic fairing assembly comprising:
   a side skirt fairing comprising an inner surface and an outer surface;
   a rear skirt fairing located aft of the side skirt fairing and comprising a transition extending outwardly of a side of the trailer envelope at a distance from the centerline of the trailer; and
   one or more struts configured to couple the side skirt fairing and the transition to one or more of the transverse structural support members.

2. The aerodynamic fairing assembly of claim 1, wherein the struts rotatably couple the side skirt fairing and the rear skirt fairing to one or more or of the transverse structural support members.

3. The aerodynamic fairing assembly of claim 1, wherein the side skirt fairing is substantially straight and runs parallel to the centerline of the trailer.

4. The aerodynamic fairing assembly of claim 1, wherein the side skirt fairing is substantially straight and is angled outwardly from the centerline of the trailer along the longitudinal axis from a front edge to a rear edge of the side skirt.

5. The aerodynamic fairing assembly of claim 1, wherein the side skirt fairing is generally planar and formed by a plurality of sections.

6. The aerodynamic fairing assembly of claim 1, wherein the aerodynamic fairing assembly is constructed from an injection molded material.

7. The aerodynamic fairing assembly of claim 6, wherein the injection molded material comprises an injection molded mixture of polycarbonate and ABS plastic.

8. The aerodynamic fairing assembly of claim 1, further comprising a front fairing located forward of the side skirt fairing.

9. The aerodynamic fairing assembly of claim 1, wherein the transition is angled outwardly with respect to the centerline of the trailer to cause misdirection of the air prior to reaching the rear of the trailer.

10. The aerodynamic fairing assembly of claim 1, further comprising:
a forward panel coupled to the sides of the trailer adjacent the rear of the trailer,
a transition located aft of the forward panel, and
a rear panel located aft of the transition and coupled to the rear door frame, wherein the transition is angled outwardly to cause misdirection of the air prior to reaching the rear door frame.

11. An aerodynamic fairing assembly for attachment to a trailer of a tractor-trailer having a top, bottom, front, rear, a pair of sides, a rear door frame, and a trailer frame having a centerline, transverse structural support members extending between sides of the trailer defining a trailer envelope, and longitudinal members extending along a length of the trailer, the aerodynamic fairing assembly comprising:
a side skirt fairing comprising an inner surface and an outer surface;
a rear skirt fairing comprising a transition located aft of the side skirt fairing and extending outwardly of the side of the trailer envelope;
one or more struts configured to couple the side skirt fairing and the rear skirt fairing to one or more or of the transverse structural support members; and
an exit skirt fairing comprising:
a forward panel coupled to the side of the trailer adjacent the rear of the trailer,
a transition located aft of the forward panel, and
a rear panel located aft of the transition and coupled to the rear door frame, wherein the transition is angled outwardly to cause misdirection of the air prior to reaching the rear door frame.

12. The aerodynamic fairing assembly of claim 11, further comprising a front fairing located forward of the side skirt fairing.

13. The aerodynamic fairing assembly of claim 12, wherein the one or more struts are configured to couple the front skirt fairing to one or more or of the transverse structural support members.

14. The aerodynamic fairing assembly of claim 11, wherein each side skirt fairing is substantially straight and is angled outwardly from the centerline of the trailer along a longitudinal axis from a front edge to a rear edge of the side skirt.

15. The aerodynamic fairing assembly of claim 11, wherein the side skirt fairing is generally planar and formed by a plurality of sections.

16. The aerodynamic fairing assembly of claim 11, wherein the aerodynamic fairing assembly is constructed from an injection molded material.

17. The aerodynamic fairing assembly of claim 16, wherein the injection molded material comprises an injection molded mixture of polycarbonate and ABS plastic.

18. The aerodynamic fairing assembly of claim 11, further comprising a front fairing located forward of the side skirt fairing.

19. The aerodynamic fairing assembly of claim 11, wherein the transition is angled outwardly with respect to the centerline of the trailer to cause misdirection of the air prior to reaching the rear of the trailer.

* * * * *